No. 889,026. PATENTED MAY 26, 1908.
G. MAGRATH.
MITER BOX.
APPLICATION FILED NOV. 4, 1907.
2 SHEETS—SHEET 2.
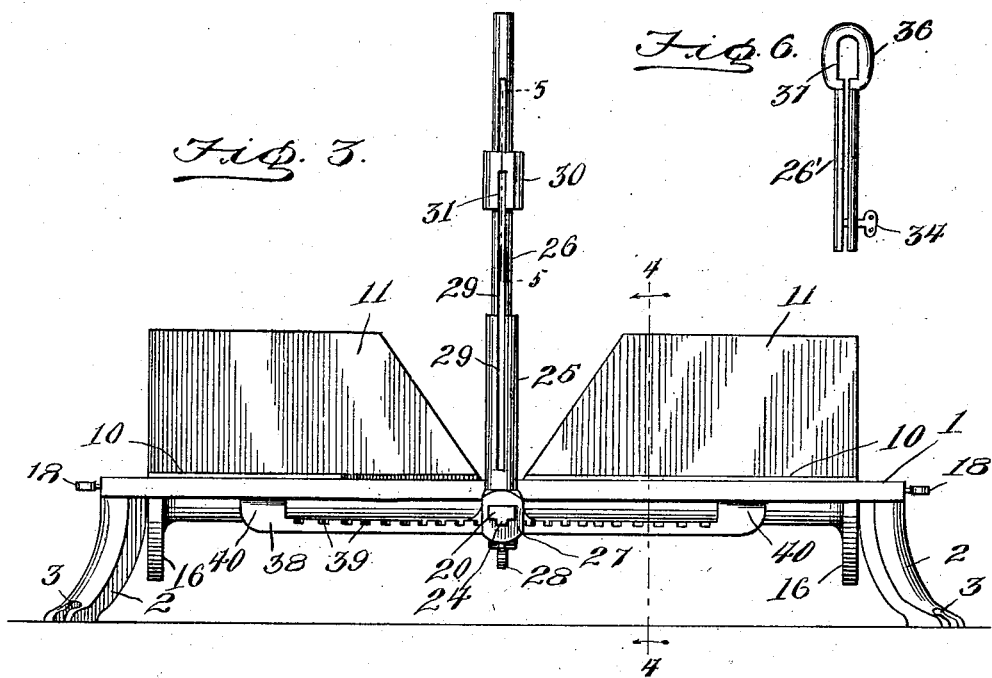
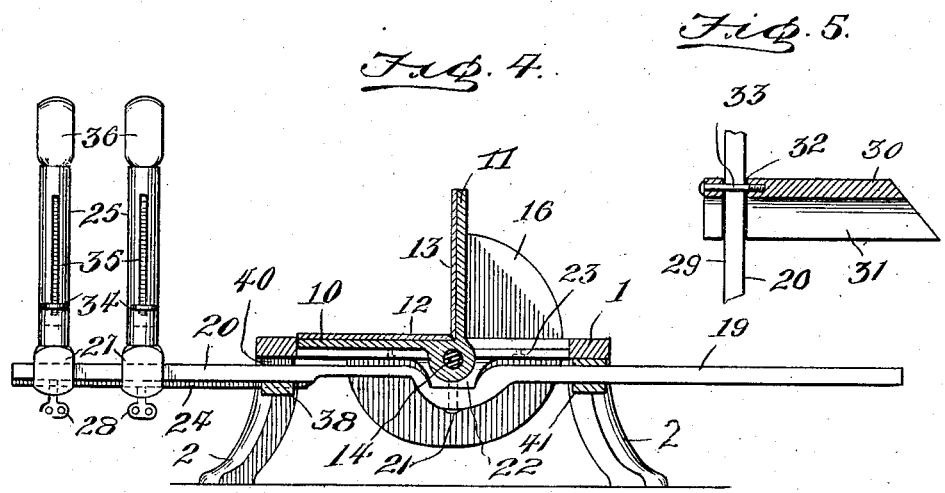
Witnesses
J. T. L. Wright
P. M. Smith
Inventor
George Magrath,
By Victor J. Evans
Attorney
THE NORRIS PETERS CO., WASHINGTON, D. C.

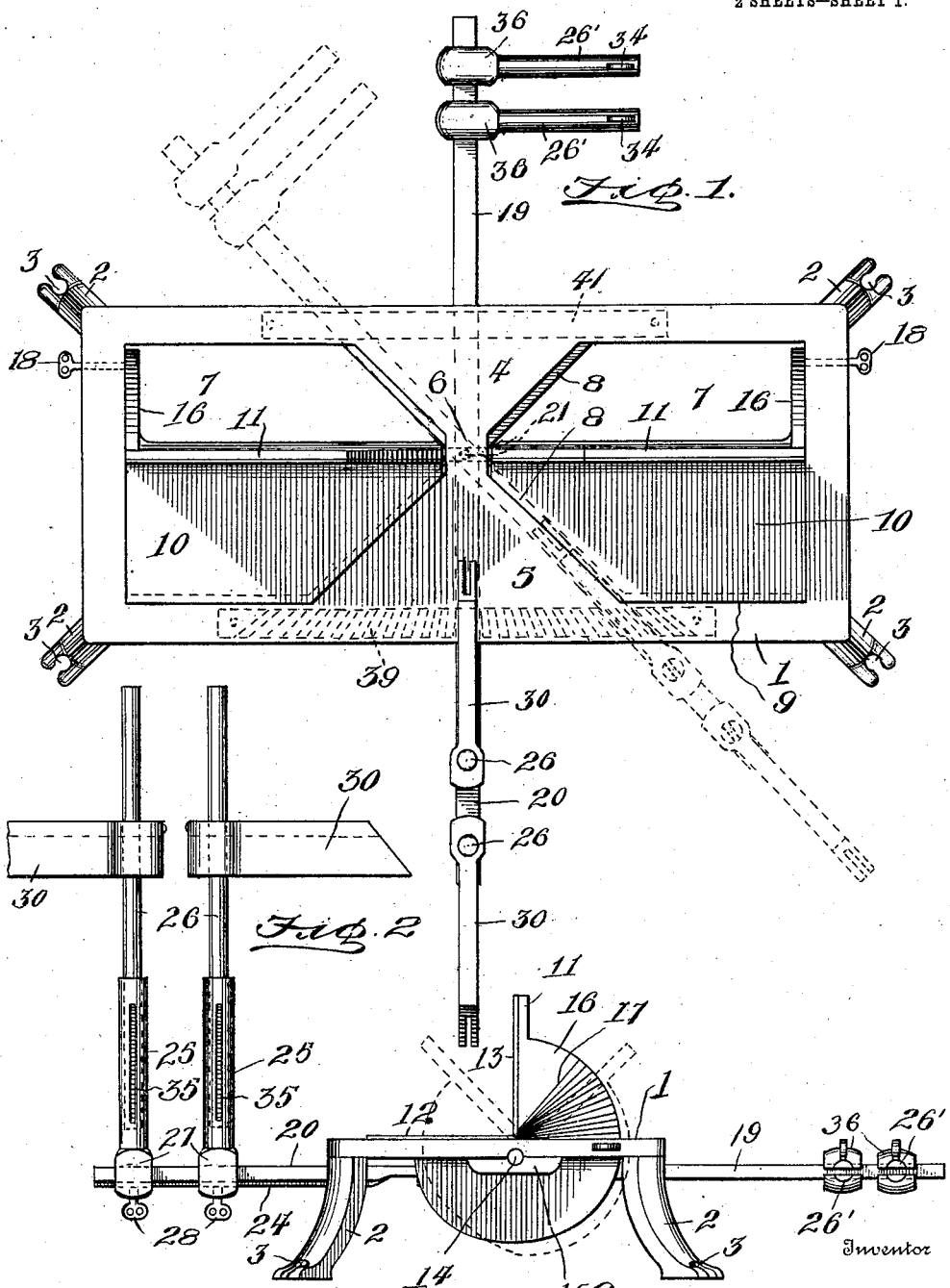

UNITED STATES PATENT OFFICE.

GEORGE MAGRATH, OF WHITINSVILLE, MASSACHUSETTS.

MITER-BOX.

No. 889,026.          Specification of Letters Patent.       Patented May 26, 1908.

Application filed November 4, 1907. Serial No. 400,537.

*To all whom it may concern:*

Be it known that I, GEORGE MAGRATH, a subject of the King of Great Britain, residing at Whitinsville, in the county of Worcester and State of Massachusetts, have invented new and useful Improvements in Miter-Boxes, of which the following is a specification.

This invention relates to miter boxes, the object of the invention being to provide a simple and practical device adapted for use in connection with any form of hand saw whereby not only the ordinary miters and angles of joiner work may be accurately determined and cut but also the compound or duplex angles which are required in cutting purlins and any other beams or timbers requiring to be cut at an angle to the two parallel surfaces thereof, and also at an angle to the remaining two parallel surfaces thereof.

With the above and other objects in view, the nature of which will more fully appear as the description proceeds, the invention consists in the novel construction, combination and arrangement of parts hereinafter fully described, illustrated and claimed.

In the accompanying drawings, Figure 1 is a plan view of a mitering machine embodying the present invention, showing the table set for producing a simple miter or angle cut. Fig. 2 is an end view of the same showing by dotted lines the way in which the table and back are adjusted to adapt the device for a compound angular cut. Fig. 3 is a rear elevation thereof. Fig. 4 is a vertical cross-section through the machine taken on the line 4—4 of Fig. 3. Fig. 5 is a detail vertical section showing the connection between one of the saw guide posts and the guide frame thereof. Fig. 6 is a detail view of one of the removable and adjustable sections of the saw guide post.

The machine comprises essentially a bed 1 of suitable size having a general rectangular shape and supported at a suitable elevation by feet 2, the lower ends of which are apertured as shown at 3 to receive screws or other fasteners by means of which the machine may be securely held down on a bench, table or other support. The bed 1 comprises oppositely located and centrally arranged triangular web portions 4 and 5 connected together as shown at 6 and the portions 4, 5 and 6 are preferably spaced or otherwise formed integrally with the margin portion of the bed as clearly shown in Fig. 1, thereby leaving two large open spaces 7, one at each side of the webs 4 and 5 and connecting part 6, in which the movable portions of the tilting trough or table move as will hereinafter appear. The opposite edges of the triangular webs 4 and 5 are rabbeted on the upper side as shown at 8 and the inner edge of the front portion of the bed 1 is also rabbeted as shown at 9 in order to form ledges on which the leaves of the table are supported while occupying a horizontal position or lying in the plane of the bed 1, this being the position occupied by the leaves of the table when performing a simple angular cut or miter.

In connection with the bed as hereinabove described, a tilting trough-like element is employed, the same comprising a table and a back for the table. The table embodies a pair of leaves 10 which are shaped to conform to the forward portions of the openings 7 in the bed, the said leaves when lowered to a horizontal position resting at their edges on the ledges 8 and 9 above described. The back of the table is also composed of two smaller leaves 11 which have the same general shape as the table leaves 10, the inner edges of both sets of leaves 10 and 11 being cut away on an angle of approximately 45° as shown, in order to provide for the proper clearance and operation of the saw used in connection with the machine.

If desired, the working surfaces of the leaves 10 and 11 may be provided with facings 12 and 13 so as to elevate the work slightly above the webs 4 and 5 of the bed, this not being essential, however, as the leaves 10 and 11 may be planed off or dressed down so as to lie flush with the upper surface of the bed 1, in which case a facing strip may be laid across the bed and the leaves 10, said facing being preferably of wood or other soft material upon which the work is placed preparatory to and during the cutting operation.

The tilting table or trough above described is provided with end trunnions 14 which are journaled in bearings 15 at the opposite ends of the bed 1. In manufacturing this part of the device, it is preferred to use a steel rod which extends entirely through the tilting table with its ends projecting beyond the ends of the table to form the trunnions 14. To attain this, the steel rod or shaft is placed in the mold prior to casting the table as a whole, the latter being molded around the rod or shaft 14 which thereafter forms practically an integral part of the table. The table also comprises the end pieces or heads 16 which extend around from the table to the back on the reverse sides thereof, as best shown in Fig. 4; that is to say, the end pieces or heads 16 extend from the bottom side of the table around the axis thereof and connect with the rear side of the back of the table, thereby effectively bracing the table and back with respect to each other and forming a good substantial structure. The heads 16 also act as gage plates for determining the angle of the table and adjusting the same correspondingly and for that purpose one or both of the heads are graduated as shown at 17 so as to register for example with the upper surface of the bed 1, at one end of the latter. This feature is illustrated in Fig. 2 in which the annular adjustment of the tilting table and back is also shown by dotted lines. 18 designates set screws at opposite ends of the bed 1, which bear at their inner ends against the heads 16, whereby the tilting table or trough may be adjusted to any desired angle and securely held when adjusted.

Extending centrally across and beneath the bed 1 is an angle bar or saw guide carrier comprising the forward and rearward arms 19 and 20, respectively. This angle bar or saw guide carrier is pivotally connected with the frame of the machine by a center pin 21 which enters a stirrup 22 extending across the center of the frame beneath the shaft 14 and secured by means of suitable fasteners 23 beneath the portions 4, 5 and 6 of the bed. The center pin 21 is located exactly in the center of the machine and midway between the leaves 10 and 11 above described, and the angle arm is adapted to swing on said pin through an arc of approximately 90°.

One arm of the angle bar is provided on its underside with a rib 24 and has mounted thereon one or more saw guides each of which is of sectional construction, embodying a lower tubular member 25 and an upper telescopic member 26 which is removable from the lower tubular member 25. The member 25 is provided with an apertured end or base 27, the aperture in which agrees with the cross-sectional shape of the arm 20 as shown in Fig. 3, the said end or base being adjustable lengthwise on the arm 20 and adapted to be held in any desired point by means of a set screw 28. Both the upper and lower members of the saw guide post are slotted longitudinally as shown at 29 to receive an ordinary saw and mounted on the upper section 26 is a saw guide arm 30 provided in its lower side with a saw receiving slot or guideway 31 which receives the top or back edge of an ordinary saw. The arm 30 is provided with an opening 32 through which the section 26 passes, as shown in Fig. 5, and is further provided with an alinement pin or key 33, which extends diametrically across the opening 32, being carried by the arm 30 and adapted to engage in the slot 29, permitting the arm 30 to be slid up and down on the section 26 of the guide post while keeping the slot 31 of said arm in alinement with the slot 29 of the saw guide post. This guide arm 31 may be left loose on the post so as to slide up and down thereon and accommodate itself to the back of the saw, it being understood that the ordinary hand saw tapers in width from one end to the other and in some cases such back edge of the saw is described on a curved line.

Where the usual miter saw is to be used in connection with the machine, I provide an adjustable and removable section 26' longitudinally slotted, the same as the section 26, and provided with a set screw 34 which is movable up and down in a slot 35, in the lower post section 25, thus adapting the section 26' to be adjusted up or down to agree with the width of the saw blade. The section 26' is provided with an enlargement or head 36 which is apertured as shown at 37 to receive the back bone or reinforcement of the miter saw blade; the said back bone or reinforcement sliding back and forth through the aperture 37 in the operation of the saw. When the removable section 26' is not in use, it may be conveniently placed on the other arm 19 of the angle bar as shown in Fig. 1, where it will be out of the way until again needed.

Extending beneath the margin of the bed 1 and adjacent to one of the longitudinal edges thereof is a rack bar 38 having notches 39 in its upper side adapted to receive the rib 24 on the underside of the arm 20 so as to hold the angle bar at the desired angle for forming the necessary cut. The rack bar 39 is supported at a suitable distance below the bed 1 by providing the same with upwardly extending feet 40 which bear against the bottom of the bed and are secured thereto in any convenient manner. At the opposite side of the table there is arranged a guide 41 which corresponds in shape with the rack 38 but which is without notches, and merely forms a support and guide for the opposite arm 19 of the angle bar.

It will be understood that one or more saw guide posts and guide arms 30 may be mounted on the arm 20 of the angle bar and that any number of interchangeable sections 26 may be employed to accommodate saws of different sizes. To form an ordinary angular cut, the table is lowered to the horizontal position illustrated in Figs. 1, 2 and 4, and the angle bar is adjusted to the proper angle and held by engaging the rib 24 with the proper notch 39 in the rack 38. The arm 20 of the angle bar and the connection between said arm and the stirrup provide for sufficient springing of said arm to enable the rib 24 to be moved out of engagement with the notched rack 38. To form a compound cut as in the case of purlins, the table or trough is tilted to the proper angle which may be determined by the graduations 17 and held at such angle by tightening the set screws 18. This feature will be found especially valuable in handling heavy timbers or beams, the cutting of which is attended with considerable difficulty and loss of time, under the plan heretofore employed. The construction described also enables the several parts of the device to be readily disassociated so that they may be the more compactly placed in the tool box or chest of a carpenter.

Having thus fully described the invention, what is claimed as new is:—

1. A mitering machine comprising an apertured bed, a tilting work support journaled in the bed and movable into and out of the apertured portion of the bed, and means for holding said support at an angle to the plane of the bed.

2. A mitering machine comprising a bed, an arm pivotally connected therewith and carrying a saw guide, a tilting trough for supporting the work at an angle to the plane of the bed and the path of movement of the saw, and means for holding said trough at any angle to the plane of the bed.

3. A mitering machine comprising a bed, an arm pivotally connected therewith and carrying a saw guide, a tilting work table adapted to be disposed at various angles relatively to the bed, a back for said table, and head pieces connecting the table and back at the opposite ends thereof and extending from the underside of the table to the rear side of the back.

4. A mitering machine comprising a bed, an arm pivotally connected therewith, a saw guide adjustable lengthwise on said arm, and a tilting work holding trough journaled in the bed and adapted to be held at various angles relatively to the bed.

5. A mitering machine comprising a bed having apertures therein, an arm pivotally connected with the bed and carrying a saw guide, and a tilting table embodying a shaft journaled on the bed and leaves movable together and adapted to occupy the apertures in the bed and to be set at various angles relatively to the bed.

6. A mitering machine embodying a bed provided with a cross web centrally thereof and apertures at opposite sides of the web, an arm pivotally connected with the bed and carrying a saw guide, and a tilting work holding element comprising table leaves movable into the apertures in the bed and adapted to be set at various angles relatively to the bed, and other leaves connected with the table leaves and forming a back substantially at right angles to the table leaves, substantially as described.

7. A mitering machine embodying a bed, an arm pivoted thereto and carrying a saw guide, and a tilting trough-like table journaled in the bed and adapted to be set at various angles relatively to the bed, said table comprising a back and end pieces or heads connecting the back with the table proper, one or both of said heads being graduated, substantially as and for the purpose described.

8. A mitering machine embodying a bed, an arm pivotally connected therewith and carrying a saw guide, a tilting trough-like work holding element journaled in the bed comprising a table and a back connected therewith, heads or end pieces connecting the table and back, and means for fastening said work holding element at various angles relatively to the bed.

9. A mitering machine comprising a bed, an arm pivotally connected therewith, and a saw guide carried by said arm and embodying slotted sections having a slidable engagement with each other, and a slotted guide arm extending at right angles to said guide and provided with a key movable in the slot of the guide, substantially as and for the purpose described.

In testimony whereof I affix my signature in presence of two witnesses.

GEORGE MAGRATH.

Witnesses:
THOMAS H. BURNS,
ALEXANDER BASSETT.